United States Patent
Lee et al.

(10) Patent No.: US 9,448,768 B2
(45) Date of Patent: Sep. 20, 2016

(54) MODULAR MULTIPLIER AND MODULAR MULTIPLICATION METHOD THEREOF

(71) Applicant: SAMSUNG ELECTRONICS CO., LTD., Suwon-si (KR)

(72) Inventors: Yong Ki Lee, Hwaseong-si (KR); Jonghoon Shin, Hwaseong-si (KR); KyoungMoon Ahn, Seoul (KR); Ji-Su Kang, Seoul (KR); Sun-Soo Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 13/792,642

(22) Filed: Mar. 11, 2013

(65) Prior Publication Data

US 2013/0311533 A1 Nov. 21, 2013

(30) Foreign Application Priority Data

May 17, 2012 (KR) .................... 10-2012-0052609

(51) Int. Cl.
*G06F 7/72* (2006.01)

(52) U.S. Cl.
CPC .............. *G06F 7/728* (2013.01); *G06F 7/722* (2013.01)

(58) Field of Classification Search
CPC ............................ G06F 7/721; G06F 7/722
USPC ................................................. 708/491, 492
See application file for complete search history.

(56) References Cited

U.S. PATENT DOCUMENTS

| | | | |
|---|---|---|---|
| 7,801,937 B1 * | 9/2010 | Langhammer | 708/492 |
| 7,802,054 B2 | 9/2010 | Park et al. | |
| 8,027,194 B2 | 9/2011 | Lee et al. | |
| 8,122,193 B2 | 2/2012 | Song et al. | |
| 2005/0198093 A1 * | 9/2005 | Son | G06F 7/728 708/625 |
| 2006/0136676 A1 | 6/2006 | Park et al. | |
| 2007/0106836 A1 | 5/2007 | Lee et al. | |
| 2009/0100120 A1 | 4/2009 | Gokay et al. | |
| 2009/0310408 A1 | 12/2009 | Lee et al. | |

(Continued)

FOREIGN PATENT DOCUMENTS

| | | |
|---|---|---|
| KR | 2000-0000770 A | 1/2000 |
| KR | 10-2010-0123361 A | 11/2001 |
| KR | 10-2009-0037124 A | 4/2009 |

OTHER PUBLICATIONS

Orup, Holger, Simplifying Quotient Determination in High-Radix Modular Multiplication, 1995, IEEE, pp. 193-199.*

Montgomery, Peter L., "Modular Multiplication Without Trial Division," Mathematics of Computation, vol. 44, No. 170, Apr. 1985, pp. 519-521.

(Continued)

*Primary Examiner* — Andrew Caldwell
*Assistant Examiner* — Calvin M Brien
(74) *Attorney, Agent, or Firm* — Sughrue Mion, PLLC

(57) ABSTRACT

A modular multiplier and a modular multiplication method are provided. The modular multiplier includes: a first register which stores a previous accumulation value calculated at a previous cycle; a second register which stores a previous quotient calculated at the previous cycle; a quotient generator which generates a quotient using the stored previous accumulation value output from the first register; and an accumulator which receives an operand, a bit value of a multiplier, the stored previous accumulation value, and the stored previous quotient to calculate an accumulation value in a current cycle, wherein the calculated accumulation value is updated to the first register, and the generated quotient is updated to the second register.

19 Claims, 3 Drawing Sheets

(56) References Cited

U.S. PATENT DOCUMENTS

2010/0082890 A1 4/2010 Heo et al.
2010/0217927 A1 8/2010 Song et al.
2010/0293216 A1 11/2010 Kim et al.
2011/0013768 A1 1/2011 Lambert

OTHER PUBLICATIONS

Orup, Holger, "Simplifying Quotient Determination in High-Radix Modular Multiplication," Proc. 12nd IEEE Symp. Comput. Arithmetic, 1995, pp. 193-199.

* cited by examiner

US 9,448,768 B2

MODULAR MULTIPLIER AND MODULAR MULTIPLICATION METHOD THEREOF

CROSS-REFERENCE TO RELATED APPLICATION

This application claims priority under 35 U.S.C. §119 from Korean Patent Application No. 10-2012-0052609, filed on May 17, 2012 in the Korean Intellectual Property Office, the entire contents of which are hereby incorporated by reference.

BACKGROUND

Apparatuses and methods consistent with exemplary embodiments relate to modular multipliers and a modular multiplication method thereof.

An operation performed in a public key crypto algorithm such as a Rivest Shamir Adleman (RSA) and an elliptic curve cryptography (ECC) is based on a modular operation. As a basic operation of the modular operation, there are a modular addition/subtraction and a modular multiplication. A modular division is not used in many algorithms because the quantity of calculations in a modular division is very large. In some cases, a modular division is calculated using a modular multiplication. A modular multiplication can be calculated by sets of modular additions. This case corresponds to a serialized multiplication and thereby its operation speed is very low. Thus, to improve performance, a modular multiplication increases a radix to be realized in a digit-serialized multiplication form.

Accordingly, operations basically performed in a public key operational unit are a modular addition/subtraction and a modular multiplication. Since a modular multiplication operation is more complicated than a modular addition/subtraction operation and a critical path of the modular multiplication operation is longer than that of the modular addition/subtraction operation, the maximum frequency of the whole secure operational unit depends on how a modular multiplication is embodied.

A modular multiplication algorithm includes two operations. The two operations are a multiplication operation and a reduction operation. A modular multiplication algorithm widely used in a hardware design is a Montgomery multiplication algorithm. The Montgomery multiplication algorithm can effectively perform a reduction operation.

The Montgomery multiplication algorithm performs a reduction determination or a quotient generation as one process of execution. If radix is small (e.g., 2 or 4), a reduction determination can be simply calculated. However, to increase a performance speed of a public key operational unit, the size of a digit is inevitably increased. At this time, a reduction determination becomes complicated and, thereby, a part for the reduction determination occupies a large portion of a critical path. This not only reduces a performance speed of the public key operation but also acts as the limit of radix increase.

SUMMARY

According to an aspect of an exemplary embodiment, there is provided a modular multiplier including: a first register which stores a previous accumulation value calculated at a previous cycle; a second register which stores a previous quotient calculated at the previous cycle; a quotient generator which generates a quotient using the stored previous accumulation value output from the first register; and an accumulator which receives an operand, a bit value of a multiplier, the stored previous accumulation value, and the stored previous quotient to calculate an accumulation value in a current cycle, wherein the calculated accumulation value is updated to the first register, and the generated quotient is updated to the second register.

According to an aspect of another exemplary embodiment, there is provided a modular multiplication method of a modular multiplier, the modular multiplication method including: calculating a quotient using a previous accumulation value for a calculation of an accumulation value of next cycle; and calculating an accumulation value using the previous accumulation value, a previous quotient, a bit value of multiplier, an operand and a modulus, wherein the previous quotient is a value calculated in a previous cycle, and, in a current cycle, the calculating the quotient and the calculating the accumulation value are independently performed.

According to an aspect of another exemplary embodiment, there is provided a modular multiplication method of a modular multiplier using a pipeline method, the modular multiplication method including: calculating, outside of a critical path of a pipeline of a modular multiplication operation, a quotient that is not used in a current cycle of the modular multiplication operation; and calculating, in the current cycle of the modular multiplication operation, an accumulation value using a previous quotient calculated in a previous cycle of the modular multiplication operation.

BRIEF DESCRIPTION OF THE FIGURES

Exemplary embodiments will be described below in more detail with reference to the accompanying drawings. Exemplary embodiments may, however, be embodied in different forms and should not be constructed as limited to the exemplary embodiments set forth herein. Rather, these exemplary embodiments are provided so that this disclosure will be thorough and complete, and will fully convey the scope of the inventive concept to those skilled in the art. Like numbers refer to like elements throughout.

DETAILED DESCRIPTION OF EXEMPLARY EMBODIMENTS

Figure 1:
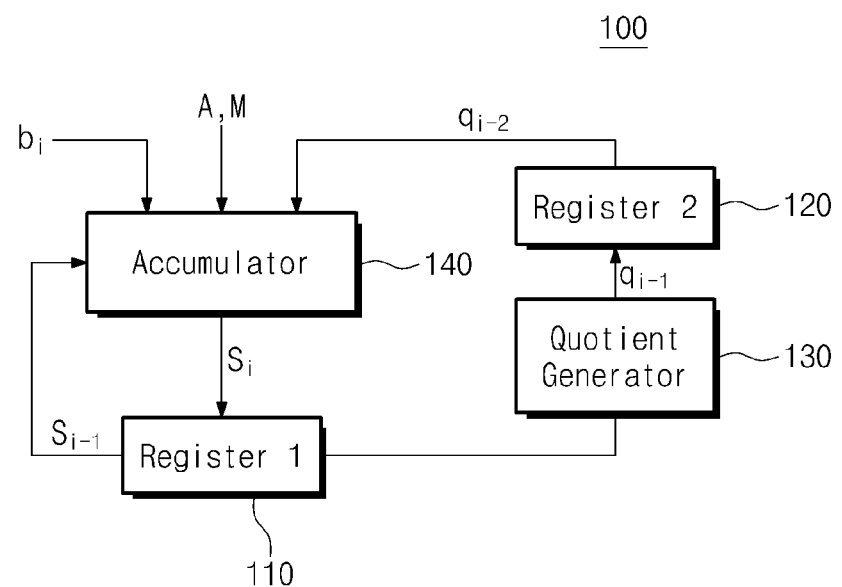
FIG. 1 is a block diagram of Montgomery multiplier in which an algorithm according to an exemplary embodiment is embodied.

Exemplary embodiments will be described more fully hereinafter with reference to the accompanying drawings. Exemplary embodiments may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

A modular multiplier using a pipeline method in accordance with an exemplary embodiment increases an operation speed by removing a process of calculating a quotient in a critical path. For convenience of description, it is assumed that the modular multiplier is a Montgomery multiplier.

A general Montgomery multiplication algorithm adopting a pipeline method will be described below.

In the case that radix is large in a Montgomery multiplication, a pipeline method may be used to reduce a critical path. An algorithm 1 below is a Montgomery multiplication algorithm having radix of 2k (where k is natural number) adopting a pipeline method:

---
Algorithm 1: Montgomery Multiplication
with pipelined high-radix
---
Input: $0 \leq A, B < 2M$ where $B = \Sigma_{i=0}^{n-1} b_i 2^{ki}$ and $b_i \in \{0,1, \ldots, 2^k - 1\}$
$2^{r-1} < M < 2^r$ where $r = nk$
m' such that $(-m' \times M) \bmod 2^k = 1$
Output: $S_n \equiv AB2^{-r} \bmod M$ where $0 \leq S_n < 2M$
1. $S_{-1} = 0; b_n = 0;$
2. For i = 0 to n
3. $\quad s_{i-1} = S_{i-1} \bmod 2^k;$
4. $\quad q_{i-1} = m' \times s_{i-1} \bmod 2^k;$
5. $\quad S_i = (S_{i-1} + q_{i-1}M) \text{ div } 2^k + b_iA;$

---

An accumulation value output from the algorithm 1 may be expressed as follows:

$$S_n = \sum_{i=0}^{n-1} (b_i A 2^{ki} + q_i M 2^{ki}) 2^{-nk}$$
$$= (AB + QM)2^{-r}$$

Here, $B = \sum_{i=0}^{n-1} b_i 2^{ki}, Q = \sum_{i=0}^{n-1} q_i 2^{ki}$

In the algorithm 1, a calculation process corresponding to a critical path proceeds in the order of step 3→step 4→step 5. Steps for generating a quotient ($q_{i-1}$), i.e., steps 3 and 4, are included in the critical path.

A modification of the algorithm 1 is disclosed in H. Orup, "Simplifying quotient determination in high-radix modular multiplication," (Proceedings of the 12th Symposium on Computer Arithmetic, pp. 193-199, 1995), incorporated herein by reference in its entirety. That is, generating the quotient ($q_i$) is simplified and thereby the quotient generation is excluded from the critical path. An algorithm 2 in accordance with Orup is as follows:

---
Algorithm 2: MM–PHR by Orup
---
Input: $2^{r-1} < M < 2^r$ where $r = nk$
$\tilde{M} = m' \times M$ such that $(-m' \times m) \bmod 2^k = 1$
$0 \leq A, B < 2\tilde{M}$ where $B = \Sigma_{i=0}^{n} b_i 2^{ki}$ and $b_i \in \{0,1, \ldots, 2^k - 1\}$
Output: $S_{n+1} \equiv AB2^{-r} \bmod M$ where $0 \leq S_{n+1} < 2\tilde{M}$
1. $S_{-1} = 0; b_{n+1} = 0;$

---

2. For i = 0 to n + 1
3. $\quad q_{i-1} = S_{i-1} \bmod 2^k;$
4. $\quad S_i = (S_{i-1} + q_{i-1}\tilde{M}) \text{ div } 2^k + b_iA;$

---

In the algorithm 2, calculation of the quotient ($q_{i-1}$) involves the least significant digit (LSD) of the accumulation value ($S_{i-1}$). If the accumulation value ($S_{i-1}$) exists in a non-redundant form, the quotient ($q_{i-1}$) can be induced without a separate calculation process. Thus, a process of calculating the quotient ($q_{i-1}$) may be excluded from the critical path.

However, in the algorithm 2, a modulus M is converted into $\tilde{M}$ to be used and thereby all the operands and a range of $\tilde{M}$ become larger by k bits. That is, a range of operated values increases to $[0, 2^{k-1}M]$. Consequently, a size of hardware for processing/storing an intermediate result and a final result increases. However, in this case, an operation process for reducing a range of result values finally calculated causes overhead. Additionally, since a range of operands increases, the number of iterations is greater than the algorithm 1.

If the accumulation value ($S_i$) exists in a redundant form, a process of converting the accumulation value ($S_i$) into a non-redundant form may be included in the critical path. To exclude that conversion process from the critical path, an extra pipeline step may be introduced. At this time, a cycle in addition increases and a range of input values and result values increases to have $[0, 2^{2+1}M]$.

An exemplary embodiment provides a Montgomery multiplication algorithm of which a range of calculation results does not become great while excluding a process of calculating a quotient from a critical path. The Montgomery multiplication algorithm in accordance with exemplary embodiments calculates a quotient one cycle ahead of time and performs a multiplying operation using a previously calculated quotient.

An algorithm 3 in accordance with an exemplary embodiment is as follows:

---
Algorithm 3 MM-RP1 (Montgomery Multiplication
with Reduction Predetermination 1)
---
Input: $0 \leq A, B < 2M$ where $B = \Sigma_{i=0}^{n-1}$, and $b_i \in \{0,1,\ldots,2^k - 1\}$,
$2^{r-1} < M < 2^r$ where $r = nk$
m' such that $(-m' \times M) \bmod 2^{2k} \equiv 1$
Output: $S_{n+1} \equiv AB2^{-r} \bmod M$ where $0 \leq S_{n+1} < 2M$
1. $S_{-1} = 0; q_{-2}; b_n = 0; b_{n+1} = 0;$
2. For i = 0 to n + 1
3. $\quad s_{i-1} = S_{i-1} \bmod 2^{2k};$
4. $\quad q_{i-1} = (m' \times s_{i-1} \bmod 2^{2k}) \text{ div } 2^k;$
5. $\quad S_i = (S_{i-1} + q_{i-2}M) \text{ div } 2^k + b_iA2^k;$

---

In step 4 of the algorithm 3, after quotient of 2k bit corresponding to two digits is calculated, only k bit which is the most significant digit (MSD) is stored as quotient ($q_{i-1}$). The stored quotient ($q_{i-1}$) is used in step 5. A condition for calculating the effective quotient ($q_{i-1}$) is that partial product ($b_1A$) with respect to $0 \leq 1 \leq i-1$ is accumulated on accumulation value ($S_{i-1}$) of previous cycle. In the step 5, the accumulation value ($S_{i-1}$) includes an intermediate value ($S_{i-1}+q_{i-2}M$)div$2^k$ and a partial product ($b_iA2^k$). Since in the step 5, the accumulation value ($S_{i-1}$) accumulates the partial product ($b_1A$), the above condition can be satisfied.

Whether final accumulation value ($S_{n+1}$) outputs a correct value can be checked as described below. While the steps 3, 4 and 5 are iterated, the following mathematical formula is satisfied:

$$S_i = (S_{i-1} + q_{i-2}M)div2^k + b_iA2^k$$

$$= S_{i-1}2^{-k} + q_{i-2}M2^{-k} + b_iA2^k$$

$$= \sum_{l=0}^{i}(q_{l-2}M2^{-k} + b_lA2^k)2^{(l-i)k}$$

$$= \sum_{l=0}^{i}(q_{l-2}M2^{k(l-1)} + b_lA2^{k(l+1)})2^{-ik}$$

$$= \sum_{l=0}^{i}(q_{l-2}M2^{k(l-2)} + b_lA2^{kl})2^{-(i-1)k}$$

Herein, $q_{-2}=q_{-1}=b_n=b_{n+1}=0$, and $0 \le i \le n+1$.

Thus, when $i=n+1$, the final result value ($S_{n+1}$) is determined by the following mathematical formula:

$$S_{n+1} = \sum_{l=0}^{n+1}(q_{l-2}M2^{k(l-2)} + b_lA2^{kl})2^{-nk}$$

Herein, since $q_{-2}=q_{-1}=b_n=b_{n+1}=0$, the final result value is expressed by the following mathematical formula:

$$S_{n+1} = \sum_{l=0}^{n-1}(q_lM2^{kl} + b_lA2^{kl})2^{-nk} = (AB+QM)2^{-r}$$

Thus, the final result value ($S_{n+1}$) is the same as that of a general Montgomery multiplication algorithm. Consequently, the suggested algorithm 3 is effective.

An index of quotient ($q_{i-1}$) generated in the step 4 of the algorithm 3 is 'i-1' and an index of quotient ($q_{i-2}$) used in the step 5 is 'i-2'. In the algorithm 3, a quotient value is calculated one cycle ahead of time as compared with time actually used. Therefore, a calculation process of the quotient can be excluded from a critical path.

FIG. 1 is a block diagram of a modular multiplier (e.g., a Montgomery multiplier 100) in which an algorithm according to an exemplary embodiment is embodied. Referring to FIG. 1, the Montgomery multiplier 100 includes a register 1 (i.e., first register) 110, a register 2 (i.e., second register) 120, a quotient generator 130, and an accumulator 140.

The register 1 110 stores an accumulation value ($S_i$) being generated in the current cycle while outputting the accumulation value (i.e., previous accumulation value) ($S_{i-1}$) of the previous cycle.

The register 2 120 stores a quotient ($q_{i-1}$) generated in the current cycle while outputting the quotient (i.e., previous quotient) ($q_{i-2}$) generated in the previous cycle.

The quotient generator 130 generates a quotient ($q_{i-1}$) which will be used in a next cycle using the accumulation value ($S_{i-1}$) of the previous cycle. Herein, a process of generating a quotient ($q_{i-1}$) corresponds to the steps 3 and 4 of the algorithm 3.

The accumulator 140 receives an operand A, a modulus M, a bit string $b_i$ of operand B, an accumulation value ($S_{i-1}$), and a quotient ($q_{i-2}$) to perform a partial multiplying operation. Herein, a part generating and accumulating a partial multiplying operation corresponds to the step 5 of the algorithm 3.

In FIG. 1, the quotient ($q_{i-1}$) is a value being stored in the register 2 120 and the quotient ($q_{i-2}$) is a value which was stored in the register 2 120 in a previous iteration and a value being input to the accumulator 140. Thus, the Montgomery multiplier 100 includes the quotient generator 130 generating quotient ($q_{i-1}$) before applying the quotient ($q_{i-2}$). Consequently, the critical path illustrated in FIG. 1 is determined by the greater delay value between a delay value of the quotient generator 130 and a delay value of the accumulator 140. For instance, a delay value of the quotient generator 130 may be greater than or smaller than that of the accumulator 140. If the two delay values are properly distributed, the related art maximum frequency of the Montgomery multiplier 100 can be maximally doubled.

A calculation of the quotient generator 130 induces a result of one digit. Because of this, the accumulator 140 performing a long operation may have a longer critical path. At this time, a calculation process of the quotient generator 130 may be excluded from the critical path.

An exemplary embodiment can provide a Montgomery multiplication algorithm removing one cycle. An algorithm 4 in accordance with another exemplary embodiment is as follows:

| Algorithm 4 MM-RP2 (Montgomery Multiplication with Reduction Predetermination 2) |
| --- |
| Input: $0 \le A,B < 2M$ where $B = \Sigma_{i=0}^{n-1}$, and $b_i \in \{0,1,...,2^k - 1\}$ <br> $2^{r-1} < M < 2^r$ where $r = nk$ <br> $\alpha_0 = A \bmod 2^k$ <br> m' such that $(-m' \times M) \bmod 2^{2k} \equiv 1$ |
| Output: $S_n \equiv AB2^{-r} \bmod M$ where $0 \le S_n < 2M$ |
| 1. $S_{-1} = 0$; $p_0 = a_0b_0 \bmod 2^k$; $q_{-1} = 0$; $b_n = 0$; $b_{n+1} = 0$; |
| 2. For i = 0 to n |
| 3. $\quad p_{i+1} = a_0b_{i+1} \bmod 2^k$; |
| 4. $\quad s_i = (S_{i-1} + p_i2^k) \bmod 2^{2k}$; |
| 5. $\quad q_i = (m' \times s_i \bmod 2^{2k}) div 2^k$; |
| 6. $\quad S_i = (S_{i-1} + q_{i-1}M) div 2^k + b_iA$; |

Just like the algorithm 3, after a quotient corresponding to two digits is calculated (m'×$s_i$ mod $2^{2k}$), only the most significant part is stored in the quotient ($q_i$) through div$2^k$ and the stored quotient ($q_i$) is used in a next iteration. Unlike the algorithm 3, to reduce one cycle, the quotient ($q_i$) is used instead of the quotient ($q_{i-1}$). Because of this, the quotient ($q_i$) is calculated using the accumulation value ($S_{i-1}$). Thus, compensation to the partial product ($b_iA$) is to be reflected in a calculation of the quotient ($q_i$). However, the whole partial product ($b_iA$) value is not needed but only the least significant digit (LSD) may be used. In the step 3, the least significant digit (LSD; $p_{i+1}$) of the partial product ($b_{i+1}A$) is calculated. The least significant digit ($p_{i+1}$) calculated in the step 3 is stored in a register and is used to compensate the accumulation value ($S_{i-1}$) in the step 4 of the next cycle. In the step 5, the effective quotient ($q_i$) is calculated using the compensated accumulation value ($s_i$).

To verify an effectiveness of the final accumulation value ($S_i$) is similar to the algorithm 3. The following mathematical formula is satisfied while an accumulation operation is iterated:

$$S_i = (S_{i-1} + q_{i-2}M)div2^k + b_iA2^k$$

$$= S_{i-1}2^{-k} + q_{i-2}M2^{-k} + b_iA2^k$$

$$= \sum_{l=0}^{i}(q_{l-2}M2^{-k} + b_lA2^k)2^{(l-i)k}$$

-continued $$= \sum_{l=0}^{i}(q_{l-2}M2^{k(l-1)} + b_l A2^{k(l+1)})2^{-ik}$$

$$= \sum_{l=0}^{i}(q_{l-2}M2^{k(l-2)} + b_l A2^{kl})2^{-(i-1)k}$$

Herein, $q_{-1}=b_n=0$, and $0 \leq i \leq n$.

Thus, final result value ($S_n$) is determined by the following mathematical formula:

$$S_n = \sum_{l=0}^{n}(q_{l-1}M2^{k(l-1)} + b_l A2^{kl})2^{-nk}$$

Herein, since $q_{-1}=b_n=0$, the final result value ($S_n$) is expressed by the following mathematical formula:

$$S_n = \sum_{l=0}^{n-1}(q_l M2^{kl} + b_l A2^{kl})2^{-nk} = (AB+QM)2^{-r}$$

Thus, the final result value ($S_n$) is the same as that of a general related art Montgomery multiplication algorithm. Consequently, the suggested algorithm 4 according to an exemplary embodiment is effective.

The total number of iterations (or the number of cycles) in the algorithm 4 is 'n+1'. The total number of iterations in the algorithm 4 is less than that of the algorithms 2 and 3 by 1 and is equal to that of the algorithm 1. A hardware overhead occurring in the algorithm 4 is a process that $p_{i+1}$ is calculated in the step 3 and the $p_{i+1}$ is added to reflect the $p_{i+1}$ in $s_i$ in the step 4. A size of $p_{i+1}$ is k-bit corresponding to 1 digit.

For instance, if radix is 16, the $p_{i+1}$ is 4 bits and if radix is 256, the $p_i$ is a mere 8 bits. In case of the most widely used RSA, a length of key is minimum 1024-bit and a size of chunk (the number of bits processed at a time) is generally 512-bit or 1024-bit. Thus, hardware overhead of the algorithm 4 is relatively small.

Since in the algorithm 4, an operation of $p_0=a_0 b_0 \bmod 2^k$ is not included in an iteration, a pre-computation is to be performed. To calculate $p_0$, only the least significant digit (LSD) of operands A and B is needed. To load the operands A and B on a secure operational unit, many cycles may be needed because a size of operand is large. Thus, if loading the least significant digit (LSD) of operands A and B in advance, and then calculating $p_0$ while loading the rest of digits, further cycles due to a pre-computation are not needed.

Figure 2:
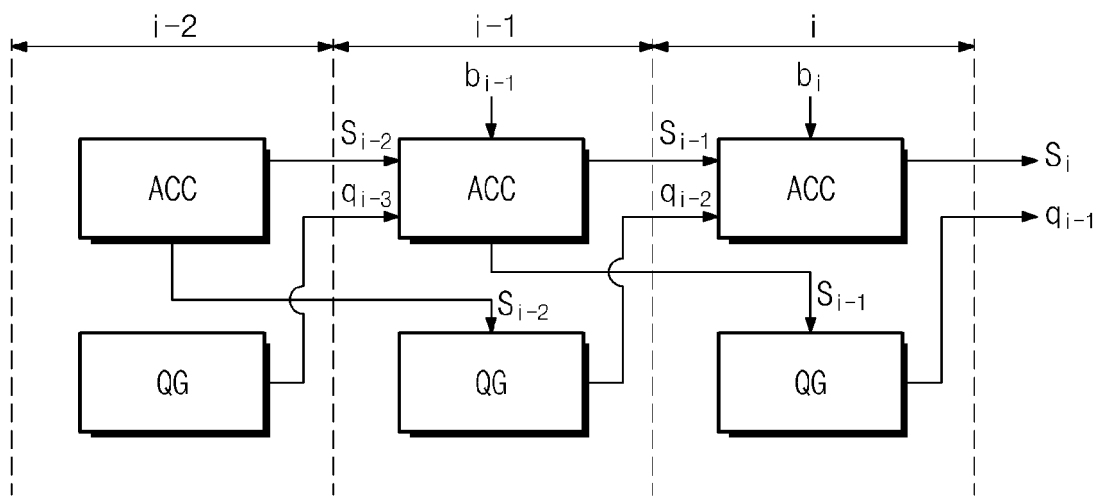
FIG. 2 is a drawing illustrating a modular multiplication operation of the Montgomery multiplier illustrated in FIG. 1 according to an exemplary embodiment.

FIG. 2 is a drawing illustrating a modular multiplication operation of the Montgomery multiplier 100 illustrated in FIG. 1 according to an exemplary embodiment. Referring to FIG. 2, in the modular multiplication operation, an operation ACC of calculating an accumulation value and an operation QG of calculating a quotient are independently performed in each of cycles (i−2, i−1, i).

Referring to FIGS. 1 and 2, a modular multiplication operation proceeds as follows.

A modular multiplication operation of i−1th cycle proceeds as follows.

In an operation QG of calculating a quotient of i−1th cycle, the quotient generator 130 receives a previous accumulation value ($S_{i-2}$) to calculate a quotient ($q_{i-2}$). Herein, the previous accumulation value ($S_{i-2}$) is a value calculated in i−2th cycle and a value output from the register 1 110 in i−1th cycle. The calculated quotient ($q_{i-2}$) is newly updated to the register 2 120.

In the operation ACC of calculating an accumulation value of i−1th cycle, the accumulator 140 receives a previous accumulation value ($S_{i-2}$), a previous quotient ($q_{i-3}$), a bit ($b_{i-1}$) of multiplier, an operand A, and a modulus M to calculate an accumulation value ($S_{i-1}$). Herein, the previous accumulation value ($S_{i-2}$) is output from the register 1 110 and the previous quotient ($q_{i-3}$) is output from the register 2 120. The previous quotient ($q_{i-3}$) is a value calculated in i−2th cycle. The calculated accumulation value ($S_{i-1}$) is newly updated to the register 1 110. With this, a modular multiplying operation of i−1th cycle is completed.

After that, a modular multiplying operation of ith cycle proceeds. The quotient generator 130 receives the previous accumulation value ($S_{i-1}$) to calculate a quotient ($q_{i-1}$) in an operation of calculating a quotient of ith cycle. The previous accumulation value ($S_{i-1}$) is a value calculated in i−1th cycle and is a value output from the register 1 110 in ith cycle. The calculated quotient ($q_{i-1}$) is newly updated to the register 2 120.

In an operation ACC of calculating an accumulation value of ith cycle, the accumulator 140 receives a previous accumulation value ($S_{i-1}$), a previous quotient ($q_{i-2}$), a bit ($b_i$) of multiplier, an operand A, and a modulus M to calculate an accumulation value ($S_i$). Herein, the previous accumulation value ($S_{i-1}$) is output from the register 1 110 and the previous quotient ($q_{i-2}$) is output from the register 2 120. The previous quotient ($q_{i-2}$) is a value calculated in i−1th cycle. The calculated accumulation value ($S_i$) is newly updated to the register 1 110. With this, a modular multiplying operation of ith cycle is completed.

In the modular multiplying operation in accordance with an exemplary embodiment, an operation QG of calculating a quotient in a current cycle and an operation ACC of calculating an accumulation value can be independently performed. For instance, a previous quotient used in the operation ACC of calculating an accumulation value is a value calculated in the operation QG of calculating a quotient of previous cycle. With this, an operation of calculating a quotient in a critical path can be excluded.

Figure 3:
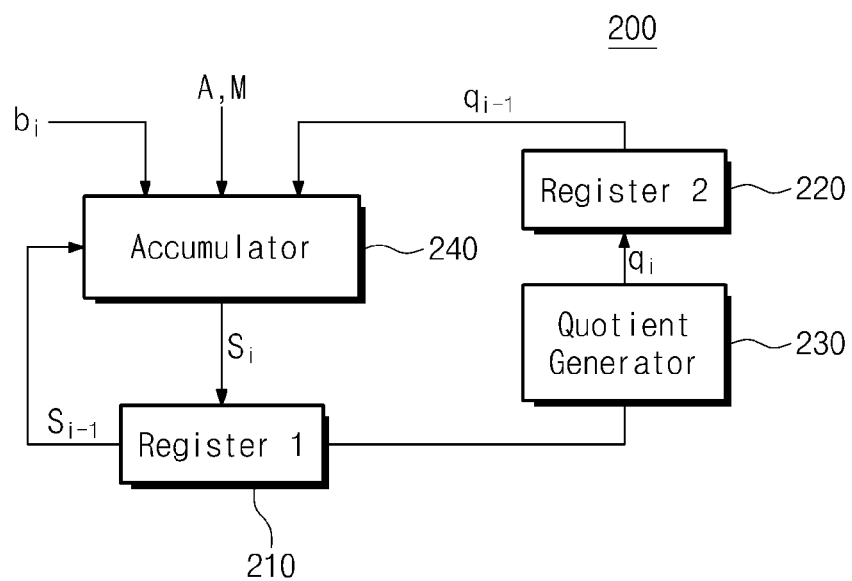
FIG. 3 is a block diagram of Montgomery multiplier in which an algorithm in accordance with another exemplary embodiment is embodied.

FIG. 3 is a block diagram of a modular multiplier (e.g., Montgomery multiplier 200) in which an algorithm according to another exemplary embodiment is embodied. Referring to FIG. 3, the Montgomery multiplier 200 includes a register 1 (i.e., first register) 210, a register 2 (i.e., second register) 220, a quotient generator 230, and an accumulator 240. In the Montgomery multiplier 200, an index of quotient $q_i$ generated from the quotient generator 230 is greater by 1 than that of the Montgomery multiplier 100 according to the exemplary embodiment illustrated in FIG. 1. Because of this, a process of generating a quotient in the Montgomery multiplier 200 is faster by one cycle than that in the Montgomery multiplier 100 and a final result in the Montgomery multiplier 200 is also faster by one cycle than that in the Montgomery multiplier 100.

The algorithm 3 can exclude a part (reduction determination) of calculating a quotient from a critical path to reduce a critical path of the Montgomery multiplication algorithm. Thus, as compared with a related art algorithm, the algorithm 3 can exclude a part of calculating a quotient in a critical path without increasing a range of operation result.

The algorithm 4 can remove an overhead of one cycle to reduce a critical path. That is, the algorithm 4 removes an overhead of cycle by minimum hardware overhead. The algorithm 4 can reduce a critical path without an increase of one cycle in a reduction determination.

Figure 4:
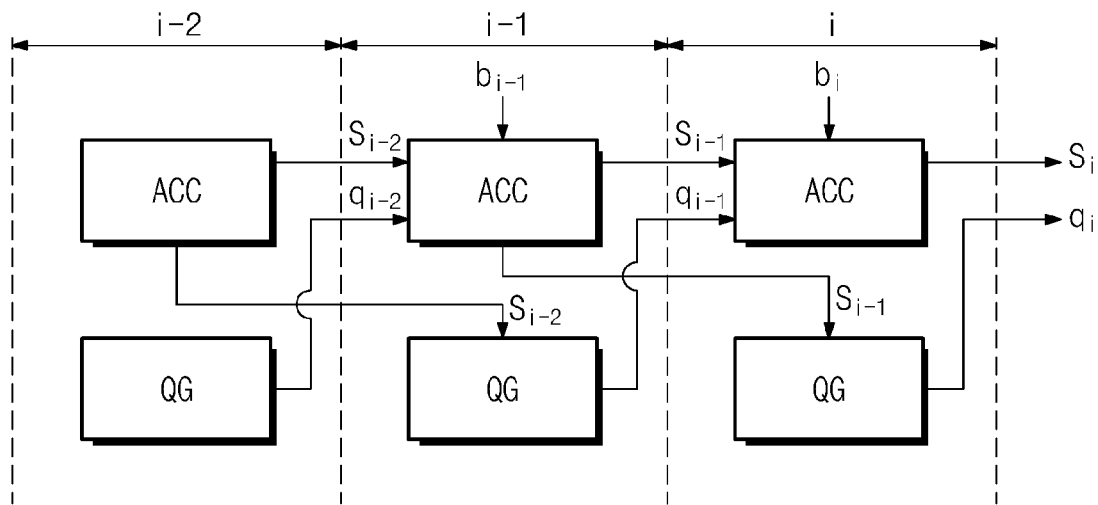
FIG. 4 is a drawing illustrating a modular multiplication operation of the Montgomery multiplier illustrated in FIG. 3 according to an exemplary embodiment.

FIG. 4 is a drawing illustrating a modular multiplication operation of the Montgomery multiplier illustrated in FIG. 3 according to an exemplary embodiment. Referring to FIGS. 3 and 4, the modular multiplication operation is as follows.

A modular multiplication operation of i−1th cycle proceeds as follows.

In an operation QG of calculating a quotient of i−1th cycle, the quotient generator 230 receives a previous accumulation value ($S_{i-2}$) to calculate a quotient ($q_{i-1}$). Herein, the previous accumulation value ($S_{i-2}$) is a value calculated in i−2th cycle and a value output from the register 1 210 in i−1th cycle. The calculated quotient ($q_{i-1}$) is newly updated to the register 2 220.

In the operation ACC of calculating an accumulation value of i−1th cycle, the accumulator 240 receives a previous accumulation value ($S_{i-2}$), a previous quotient ($q_{i-2}$), a bit ($b_{i-1}$) of multiplier, an operand A, and a modulus M to calculate an accumulation value ($S_{i-1}$). Herein, the previous accumulation value ($S_{i-2}$) is output from the register 1 210 and the previous quotient ($q_{i-2}$) is output from the register 2 220. The previous quotient ($q_{i-2}$) is a value calculated in i−2th cycle. The calculated accumulation value ($S_{i-1}$) is newly updated to the register 1 210. With this, a modular multiplying operation of i−1th cycle is completed.

After that, a modular multiplying operation of ith cycle proceeds. The quotient generator 230 receives the previous accumulation value ($S_{i-1}$) to calculate a quotient ($q_i$) in an operation of calculating a quotient of ith cycle. The previous accumulation value ($S_{i-1}$) is a value calculated in i−1th cycle and is a value output from the register 1 210 in ith cycle. The calculated quotient ($q_i$) is newly updated to the register 2 220.

In an operation ACC of calculating an accumulation value of ith cycle, the accumulator 240 receives a previous accumulation value ($S_{i-1}$), a previous quotient ($q_{i-1}$), a bit ($b_i$) of multiplier, an operand A, and a modulus M to calculate an accumulation value ($S_i$). Herein, the previous accumulation value ($S_{i-1}$) is output from the register 1 210 and the previous quotient ($q_{i-1}$) is output from the register 2 220. The previous quotient ($q_{i-1}$) is a value calculated in i−1th cycle. The calculated accumulation value ($S_i$) is newly updated to the register 1 210. With this, a modular multiplying operation of ith cycle is completed.

In the modular multiplication operation in accordance with an exemplary embodiment, an operation of calculating a quotient is faster by one cycle than that of the modular multiplication operation illustrated in FIG. 1.

Figure 5:
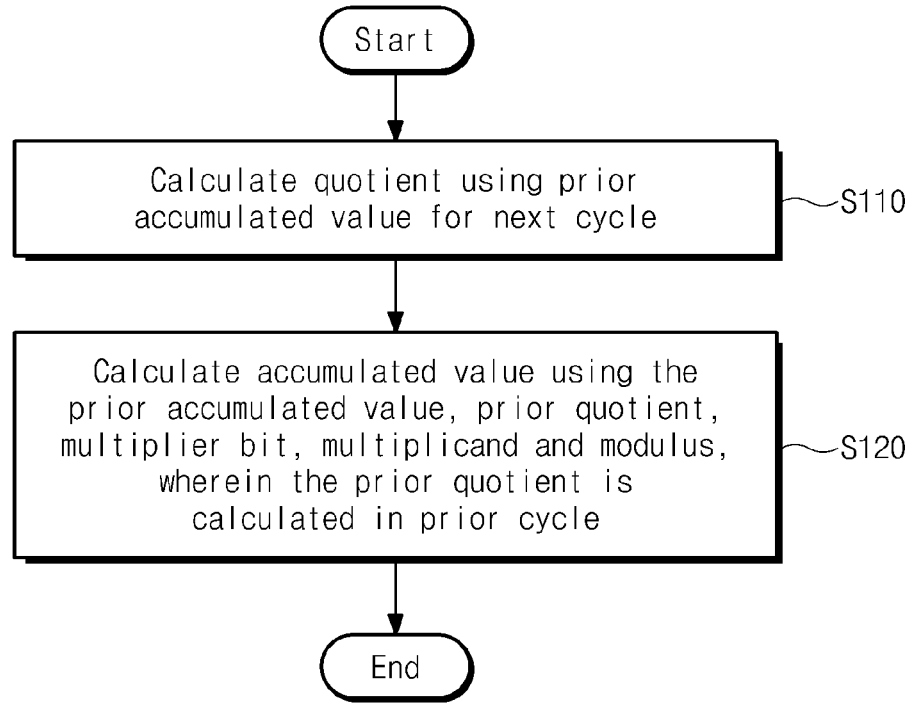
FIG. 5 is a flow chart illustrating a modular multiplication method of a modular multiplier using a pipeline method according to an exemplary embodiment.

FIG. 5 is a flow chart illustrating a modular multiplication method of modular multiplier using a pipeline method according to an exemplary embodiment. Referring to FIG. 5, a modular multiplication method is as follows.

The modular multiplier 100 or 200 calculates a quotient ($q_{i-1}$ or $q_i$) using a previous accumulation value ($S_{i-1}$) (operation S110). The calculated quotient may be used for calculating an accumulation value in a next cycle. The modular multiplier 100 or 200 calculates an accumulation value $S_i$ using a previous accumulation value ($S_{i-1}$), a previous quotient ($q_{i-2}$ or $q_{i-1}$), a bit ($b_i$) of multiplier, an operand A, and a modulus M (operation S120).

According to an exemplary embodiment, in a current cycle, a step of calculating a quotient and a step of calculating an accumulation value can be independently performed. For example, in case of FIG. 1, a calculation operation of the accumulation value $S_i$ and a calculation operation of the quotient $q_{i-1}$ have a mutual interdependence between them. However, since result values of calculation operations are stored in the registers 110 and 120, and then are used as input values for each other, a calculation operation of the accumulation value $S_i$ and a calculation operation of the quotient $q_{i-1}$ do not affect a critical path of each other. That is, in one cycle, a calculation operation of the accumulation value $S_i$ and a calculation operation of the quotient $q_{i-1}$ are independently performed. In case of FIG. 3, a calculation operation of the accumulation value $S_i$ and a calculation operation of the quotient $q_i$ are independently performed in one cycle.

Consequently, the modular multiplication method according to an exemplary embodiment can remove a step of calculating a quotient from a critical path by independently performing a step of calculating a partial product and a step of calculating a quotient.

Figure 6:
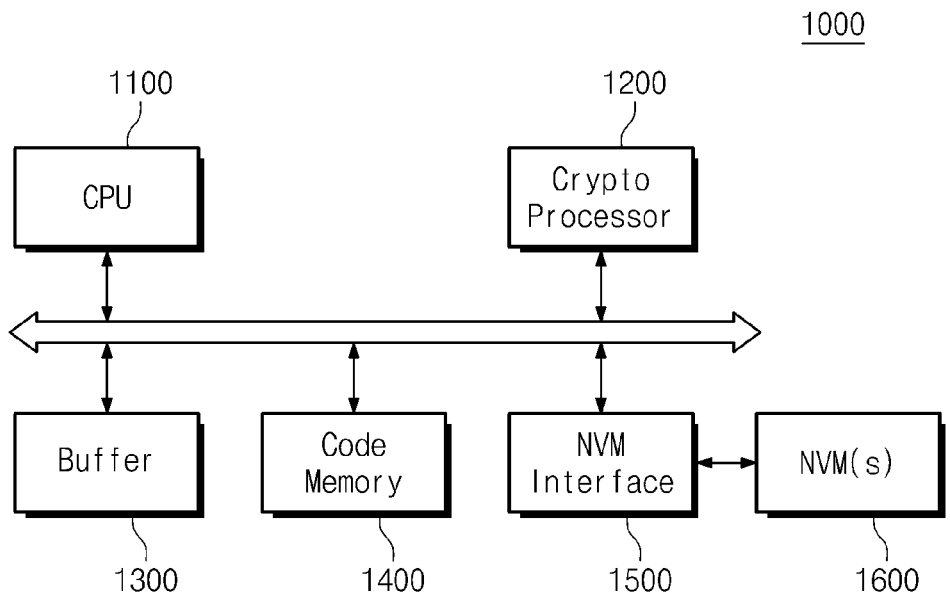
FIG. 6 is a block diagram illustrating a memory system including a crypto processor having a Montgomery multiplier according to an exemplary embodiment.

FIG. 6 is a block diagram illustrating a memory system 1000 including a crypto processor having a Montgomery multiplier according to an exemplary embodiment. Referring to FIG. 6, the memory system 1000 includes a central processing unit (CPU) 1100, a crypto processor 1200, a buffer memory 1300, a code memory 1400, a nonvolatile memory interface 1500, and at least one nonvolatile memory 1600.

The CPU 1100 controls an overall operation of the memory system 1000. The crypto processor 1200 decodes a command that enables a code (e.g., certification or an electronic signature) and processes data according to a control of the CPU 1100. The crypto processor 1200 includes at least one of the modular multipliers 100 and 200 illustrated in FIGS. 1 and 2. The buffer memory 1300 can store data used for driving the memory system 1000, for example, input/output data or data used in a code process. The buffer memory 1300 can be embodied by a volatile memory device such as dynamic random access memory (DRAM), static random access memory (SRAM), etc. The code memory 1400 may store code data used for operating the memory system 1000 or may store a secure module and a modulus for data to be protected such as key used for an electronic signature. The code memory 1400 may be embodied by a nonvolatile memory device such as read-only memory (ROM), parameter random access memory (PRAM), etc. The nonvolatile memory interface 1500 performs an interface with at least one nonvolatile memory device 1600. The nonvolatile memory device 1600 stores user data.

The memory system 1000 in accordance with an exemplary embodiment can process data more quickly as compared with a related art memory system by removing a process of calculating a quotient when performing a modular multiplication operation. Details about constitution of the memory system 1000 may be as disclosed in U.S. Pat. Nos. 7,802,054, 8,027,194, 8,122,193, U.S. Patent Application Publication Nos. 2007/0106836, and 2010/0082890, which are incorporated herein by reference in their entireties.

In a modular multiplier and a modular multiplying method thereof according to an exemplary embodiment, the maximum operation frequency of a public key can be maximally doubled by removing a calculation process of reduction determination from a critical path of a Montgomery multiplication algorithm.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more of the above-described elements can include circuitry, a processor, a microprocessor, etc., and may execute a computer program stored in a computer-readable medium.

The above-disclosed exemplary embodiments are to be considered illustrative, and not restrictive, and the appended claims are intended to cover all such modifications, enhancements, and other exemplary embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A modular multiplier comprising:
a first register which stores a previous accumulation value calculated at a previous cycle;
a second register which stores a previous quotient calculated at the previous cycle; and
at least one hardware processor configured to implement:
a quotient generator which generates a quotient, which is not used in a current cycle, using the stored previous accumulation value output from the first register; and
an accumulator which receives an operand, a bit value of a multiplier, the stored previous accumulation value, and the stored previous quotient to calculate an accumulation value in the current cycle,
wherein the calculated accumulation value is updated to the first register
wherein the generated quotient is updated to the second register, and
wherein the generating the quotient and the calculating the accumulation value are independently performed in the current cycle to exclude the generating the quotient in a critical path of a next cycle.

2. The modular multiplier of claim 1, wherein:
the generated quotient satisfies a mathematical formula of $q_{i-1} = (m' \times s_i \mod 2^{2k}) \text{div} 2^k$, where $q_{i-1}$ is the generated quotient, m' is $(-m' \times M) \mod 2^2 k \equiv 1$, M is a modulus, k is a natural number, $s_{i-1} S_{i-1} \mod 2^{2k}$, and $S^{i-1}$ is the previous accumulation value; and
the calculated accumulation value satisfies a mathematical formula of $S_i = (S_{i-1} + q_{i-2} M) \text{div} 2^k + b_i A 2^k$, where $S_i$ is the calculated accumulation value, $b_i$ is the bit value of the multiplier, and A is the operand.

3. The modular multiplier of claim 2, wherein the quotient generator updates the generated quotient to the second register after the accumulator calculates the accumulation value.

4. The modular multiplier of claim 2, wherein:
the operand and the multiplier satisfy 0<A, B<2M, where A is the operand, B is the multiplier, $B = \Sigma_{i=0}^{n-1} b_i 2^{ki}$, n is a number of bit strings of the multiplier; and
the modulus satisfies $2^{r-1} < M < 2^r$, where M is the modulus and r = nk.

5. The modular multiplier of claim 4, wherein the accumulator satisfies initial conditions of $S_{-1}=0$, q−2=0, $b_n=0$, and $b_{n+1}=0$.

6. The modular multiplier of claim 5, wherein:
a modular multiplication operation is iterated from i=0 to i=n+1; and
the calculated accumulation value satisfies $S_{n+1} \equiv AB2^{-r} \mod M$, where $0 \leq S_{n+1} < 2M$.

7. The modular multiplier of claim 1, wherein a previous quotient is calculated in at least one previous cycle without using a previous accumulation value.

8. The modular multiplier of claim 7, wherein:
the generated quotient satisfies a mathematical formula of $q_i = (m' \times s_i \mod 2^{2k}) \text{div} 2^k$, where $q_i$ is the generated quotient, m' is $(-m' \times M) \mod 2^{2k} \equiv 1$, M is a modulus, k is a natural number, $s_i = (S_{i-1} + p_i 2^k) \mod 2^{2k}$, $S_{i-1}$ is the previous accumulation value, $p_i = a_0 b_i \mod 2k$, $a_0 = A \mod 2k$, and A is the operand; and
the calculated accumulation value satisfies a mathematical formula of $S_i = (S_{i-1} + q_{i-1} M) \text{div} 2^k + b_i A$, where $S_i$ is the calculated accumulation value and $b_i$ is the bit value of the multiplier.

9. The modular multiplier of claim 8, wherein the operand and the multiplier satisfy $0 \leq A, B < 2M$, where A is the operand, B is the multiplier, $B = \Sigma_{i=0}^{n-1} b_i 2^{ki}$, and n is a number of bit strings of the operand; and
the modulus satisfies $2^{r-1} < M < 2^r$, where M is the modulus and r=nk.

10. The modular multiplier of claim 9, wherein the accumulator satisfies initial conditions of $S_{-1}=0$, $p_0 = a_0 b_0 \mod 2^k$, $q_{-1}=0$, $b_n=0$, and $b_{n+1}=0$.

11. The modular multiplier of claim 10, wherein:
a modular multiplication operation is iterated from i=0 to i=n; and
the calculated accumulation value satisfies $S_n \equiv AB2^{-r} \mod M$, where $0 \leq S_n < 2M$.

12. A modular multiplication method of a modular multiplier using a pipeline method, the modular multiplication method comprising:
calculating, by a quotient generator in a current cycle, a quotient using a previous accumulation value for a calculation of a next accumulation value of a next cycle; and
calculating, by an accumulator in the current cycle, an accumulation value using the previous accumulation value, a previous quotient, a bit value of a multiplier, an operand, and a modulus,
wherein the previous quotient is a value calculated in a previous cycle, and
wherein, in the current cycle, the calculating the quotient and the calculating the accumulation value are independently performed to exclude the calculating the quotient in a critical path of the next cycle.

13. The modular multiplication method of claim 12, wherein a previous quotient is calculated in at least one previous cycle without using a previous accumulation value.

14. The modular multiplication method of claim 12, wherein the previous accumulation value and the previous quotient are calculated in the previous cycle.

15. A modular multiplication method of a modular multiplier using a pipeline method, the modular multiplication method comprising:

calculating, by a quotient generator outside of a critical path of a pipeline of a modular multiplication operation, a quotient that is not used in a current cycle of the modular multiplication operation; and calculating, by an accumulator in the current cycle of the modular multiplication operation, an accumulation value using a previous quotient calculated in a previous cycle of the modular multiplication operation, wherein the calculating the quotient and the calculating the accumulation value are independently performed in the current cycle to exclude the calculating the quotient in a critical path of a next cycle.

16. The modular multiplication method of claim 15, wherein the quotient is calculated using a previous accumulation value calculated in the previous cycle of the modular multiplication operation, and is for a calculation of a next accumulation value of a next cycle of the modular multiplication operation.

17. The modular multiplication method of claim 15, wherein the calculating the accumulation value comprises calculating, in the current cycle, the accumulation value using a previous accumulation value calculated in the previous cycle of the modular multiplication operation, the previous quotient, a bit value of a multiplier, an operand, and a modulus.

18. A non-transitory computer readable recording medium having recorded thereon a program executable by a computer for performing the method of claim 12.

19. A non-transitory computer readable recording medium having recorded thereon a program executable by a computer for performing the method of claim 15.

* * * * *